United States Patent [19]

Hiraishi

[11] Patent Number: 4,712,279

[45] Date of Patent: Dec. 15, 1987

[54] CLASP FOR PERSONAL ORNAMENTS

[75] Inventor: Mamoru Hiraishi, Hino, Japan

[73] Assignee: Heiwado Boueki Kabushiki Kaisha, Tokyo, Japan

[21] Appl. No.: 907,913

[22] Filed: Sep. 16, 1986

[30] Foreign Application Priority Data

Jul. 18, 1986 [JP] Japan .................................. 61-167829

[51] Int. Cl.⁴ .............................................. A44B 13/00
[52] U.S. Cl. ............................. 24/241 R; 24/241 PS; 24/241 SP
[58] Field of Search ............ 24/241 R, 241 PS, 241 S, 24/241 SP, 241 SB, 239, 242, 232; 63/6, 8, 10

[56] References Cited

U.S. PATENT DOCUMENTS

| | | | |
|---|---|---|---|
| 90,938 | 6/1869 | Eck | 24/242 |
| 158,220 | 12/1874 | Reynolds | 24/241 PS |
| 544,483 | 8/1895 | Eckert | 24/242 |
| 628,619 | 7/1899 | Alwood | 24/241 SP |
| 739,226 | 9/1903 | Sanborn | 24/242 |
| 1,166,952 | 1/1916 | Wahlstrom | 24/241 R |
| 2,216,499 | 10/1940 | Ohotto | 24/239 |
| 3,950,828 | 4/1976 | Szamborski | 24/241 R |

FOREIGN PATENT DOCUMENTS 2106584  4/1983  United Kingdom ............. 24/241 R

Primary Examiner—Victor N. Sakran
Attorney, Agent, or Firm—Armstrong, Nikaido, Marmelstein & Kubovcik

[57] ABSTRACT

An improvement in a clasp for personal ornaments comprising a hook-shaped main body and a closing piece biased by means of a spring so as to close an opening thereof, the closing piece having one end to serve as a closing portion and the other end serving as an operating portion for the closing piece. The closing piece is provided at its base portion with an engaging portion and a locking member which engages the engaging portion at a position where the closing piece is pushed opened to maintain that position.

4 Claims, 3 Drawing Figures

CLASP FOR PERSONAL ORNAMENTS

BACKGROUND OF THE INVENTION

1. Field of the Invention

This invention relates to a clasp for personal ornaments, and more particularly, to a clasp which facilitates wearing and unwearing thereof.

2. Description of the Prior Art

A clasp for personal ornaments such as a necklace, a bracelet and the like is composed of a hook-shaped main body and a closing piece biased by a spring so as to close an opening of the body. The clasp generally used is designed so that when the ornaments is desired to be worn, the closing piece is pressed by a nail to open it, a hook portion is hooked on a locking ring or the like under said condition, and pressing is stopped to return the closing piece to its original position under the action of the spring to prevent a clasp from being disengaged.

Also, in a bracelet-watch recently available, a bracelet is engaged and locked to a locking ring provided on the watch by means of a clasp as described above thereby wearing and unwearing the watch. This provides a freshness in terms of design as compared with conventional products which are worn and unworn by use of a metal part provided in an intermediate portion of a watch-band.

However, the closing piece of the clasp for these personal ornaments is so small that a woman who has long nails feels a difficulty to push open the closing piece against the spring by her nail tip. In addition, in case of the necklace, the hook has to be brought into engagement with the locking ring behind the neck under the condition that the closing piece is pushed open. In case of the bracelet and watch, the closing piece has to be pushed open and engaged by one hand alone. Therefore, it has been general that one except particularly skillful persons feels a difficulty in wearing and unwearing them.

SUMMARY OF THE INVENTION

The present invention provides a clasp which can be easily engaged and disengaged by anybody without increasing its size.

According to the present invention, an engaging portion is provided on a closing piece biased by a spring of a clasp, and a locking portion is provided which engages the engaging portion at a position where the closing piece is pushed open to maintain said position. This locking member can be easily released from its engagement.

In wearing the personal ornaments having a clasp according to the present invention, the closing piece is first pushed open till the engaging portion engages the locking member. Thereby, the clasp is maintained with its closing piece opened, and therefore, a hook portion thereof may be easily engaged with a locking ring even behind the neck or by one hand alone. Thereafter, if the locking member is operated to disengage the closing piece, the closing piece closes an opening of the hook portion under the action of the spring. In cases where the personal ornaments is removed, the closing piece is opened and the hook portion is then slowly disengaged.

DETAILED DESCRIPTION OF THE PREFERRED EMBODIMENT

An embodiment of the present invention will now be described in connection with the accompanying drawings.

Figure 1:
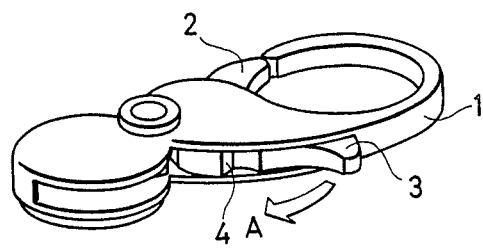
FIG. 1 is a perspective view showing one embodiment in which the clasp of the present invention is closed.
Figure 2:
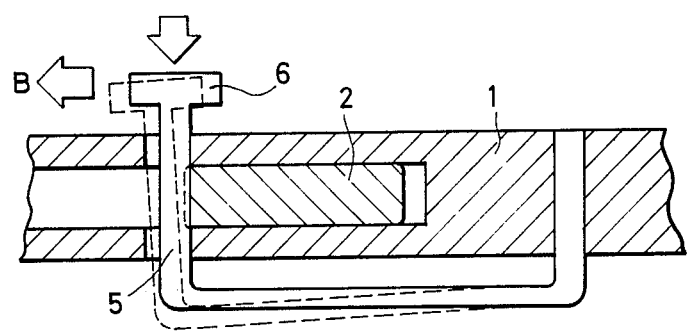
FIG. 2 is a fragmentary sectional view of the body thereof.
Figure 3:
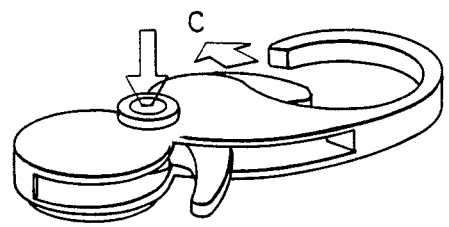
FIG. 3 is a perspective view in which the closing piece is opened.

FIG. 1 is a perspective view of one embodiment according to the present invention. A closing piece 2 adapted to close a hook portion 1 is always biased so as to close an opening by means of a spring. This closing piece 2 has an operating portion 3 at the other end thereof to facilitate an opening operation of the closing piece 2, and is formed with a notch which serves as an engaging portion 4. A hook-shaped body 1 is provided with a locking member 5 which engages the engaging portion 4 of the closing piece 2 as shown in FIG. 2 which is a sectional view. In this embodiment, the locking member 5 comprises a lever having one base end secured and extending along the body 1, the other end extending on the body 1 to serve as a release operating portion 6, which is able to obtain a sufficient spring action without making the clasp body a large size. In wearing and unwearing, the operating portion 3 is turned as indicated by the arrow A whereby the engaging portion 4 comes into engagement with the locking member 5 to maintain the closing piece 2 open as shown in FIG. 3. Under this condition, after the hook portion is brought into engagement with or disengaged from an engaging ring, if the operating portion 6 is pressed as indicated by arrow B, the engaging member 5 is inclined as shown by the dotted lines in FIG. 2 by the spring action of the lever to release the engagement with the engaging portion 4, and the closing piece 2 closes the opening of the hook as shown by the arrow C in FIG. 3.

While in the above-described embodiment, the other end of the closing piece 2 is made to serve as the operating portion 3, it is to be noted that the closing piece 2 can be made so as to be opened directly by pressing it by a nail or the like without the provision of the closing piece 2, and that insted of the locking member 5 which uses the spring action of the lever, there can be provided a locking member which encases therein a coil spring and which is biased by said spring. As described above, the present invention may be variously changed in design within the scope of the invention.

The clasp according to the present invention has a simple structure in which an engaging portion is provided on a closing piece, the engaging portion being brought into engagement with a locking member, whereby the personal ornaments may be very easily worn or unworn behind the neck or by one hand, thus enabling to extend the range of application of the clasp. Furthermore, the present invention further exhibits an effect that when the closing piece 2 is released by the operation of the operating portion 6, it is closed by means of a spring, at which time 'a click' sound is produced, which makes it possible to ensure that the device has been actuated without viewing it when the operation is made behind the necks or the like, thus eliminating uneasiness whether positive wearing was made.

What is claimed is:

1. A clasp for personal ornaments comprising:
   a hook shaped main body,
   a closing piece pivotally mounted in the main body biased by a spring so as to close an opening thereof, said closing piece having a closing portion at one end thereof, an operating portion at the other end thereof, and an engaging portion intermediate of said closing portion and said operating portion, and
   a locking member engaging said engaging portion at a position of said closing piece where said closing portion opens said opening of said main body and holding said closing piece at said position.

2. The clasp as set forth in claim 1 wherein the locking member comprises a lever having one end secured to the main body, the other end thereof being an engagement-release operating portion.

3. The clasp as set forth in claim 1, wherein said locking member comprises an L-shaped lever having one end secured to said main body and the other end movable in a cantilever manner in a plane perpendicular to a main plane of said clasp, said other end of said L-shaped lever extending through said main body and engaging said engaging portion when said closing piece is open.

4. The clasp as set forth in claim 3, wherein said other end of said L-shaped lever includes an operating button for releasing said engaging when pushed by a user.

* * * * *